UNITED STATES PATENT OFFICE.

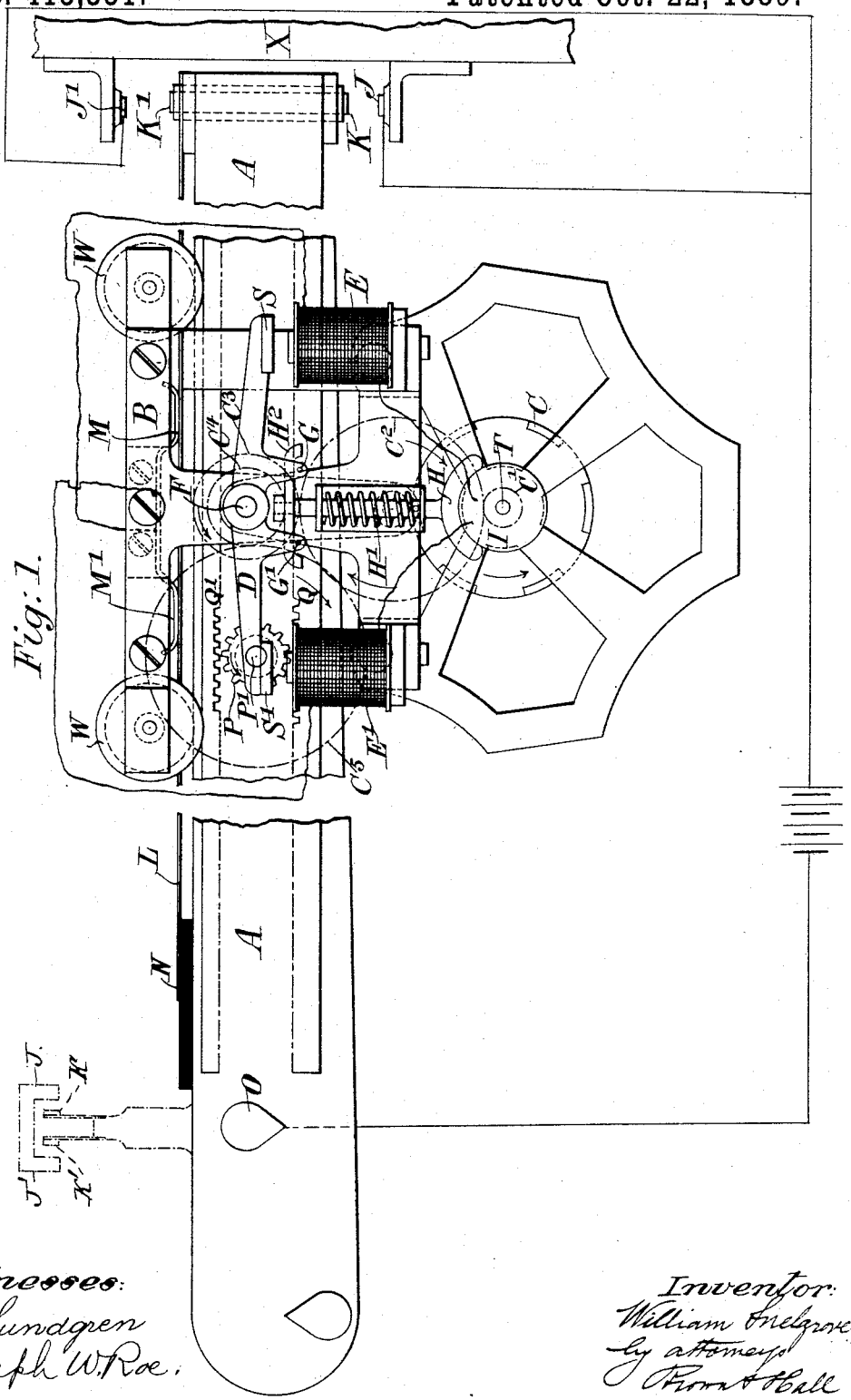

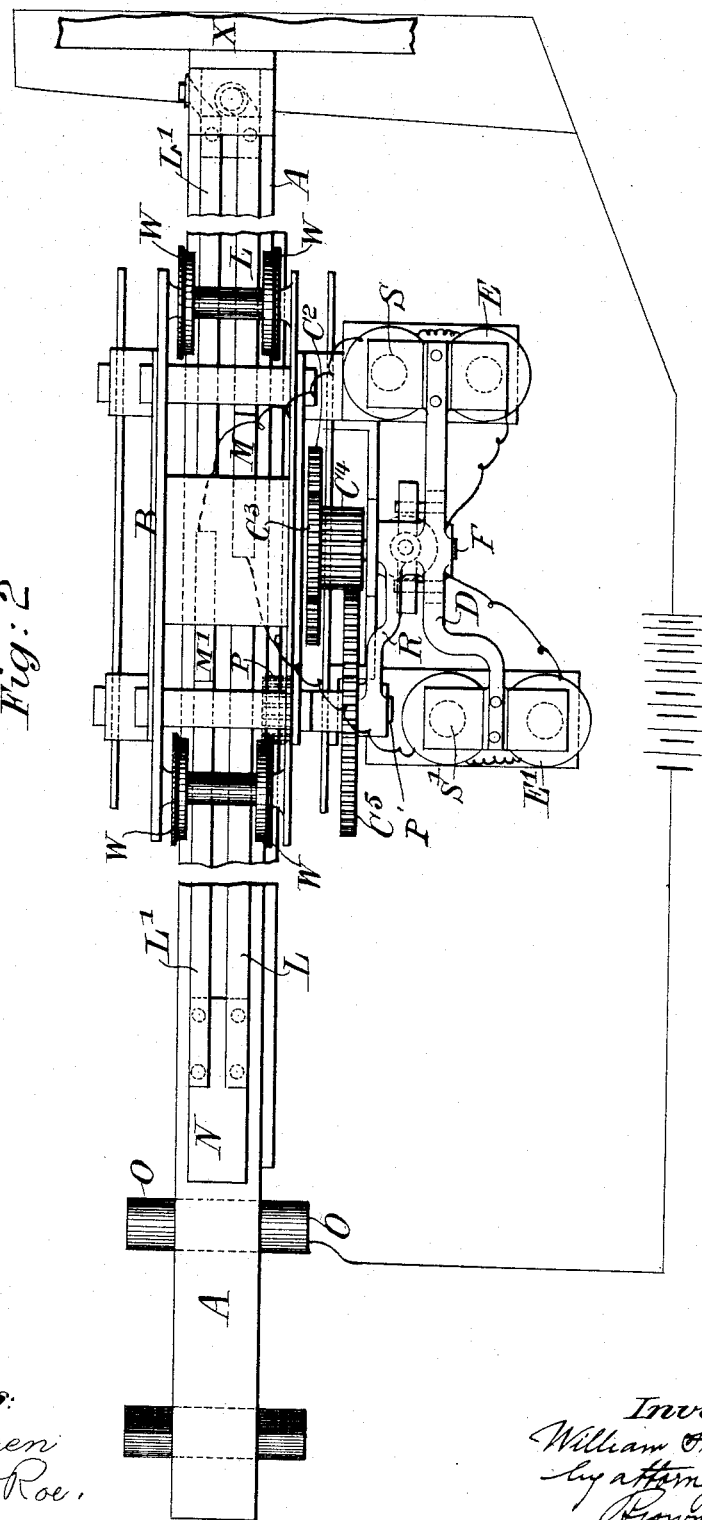

WILLIAM SNELGROVE, OF BANKWOOD, COUNTY OF WORCESTER, ENGLAND.

WEIGHING APPARATUS.

SPECIFICATION forming part of Letters Patent No. 413,331, dated October 22, 1889.

Application filed July 10, 1888. Serial No. 279,523. (No model.) Patented in England May 19, 1887, No. 7,335.

*To all whom it may concern:*

Be it known that I, WILLIAM SNELGROVE, of Bankwood, Church Road, Moseley, in the county of Worcester, England, have invented certain new and useful Improvements in Weighing Apparatus, of which the following is a specification. The same has been patented to me in Great Britain, No. 7,335, dated May 19, 1887.

This invention consists in a certain combination of elements whereby motive power is caused to effect the movement of the weights or poises in weighing apparatus, such weights or poises being caused to move automatically when the goods to be weighed are placed upon or removed from the scale-pan or platform.

The invention is applicable to all kinds of weighing apparatus in which a weighing-beam is employed, whether a balanced beam or steelyard.

In the accompanying drawings, Figure 1 shows a side elevation of a weighing-scale embodying my invention. Fig. 2 is a top plan view of the same.

The beam A is suspended on knife-edges O, in the usual manner, and its free end or ends (or a pointer carried by the beam) is or are provided with contact pieces or points K' K, which strike against electrical contact-points J' and J, connected with or carried by the loop guides or carriers X or other parts of the machine. The sliding weight or poise B is propelled in each direction along the beam by electro-motive force, which is communicated through a motor or motors carried by the weight or the beam, and which, by means of a rack and pinion or endless-screw arrangement, propels the weight forward or backward, as the case may be when the contacts J' K' or J K come together as the goods are placed on or removed from the platform or scale-pan. The weight or poise B is mounted on grooved or flanged wheels W W, so that it may travel freely on the beam A. The motor or motors are carried by the weight B, being supported by arms or brackets pendent from the weight on each side of the beam A. The poise is provided with a pinion P, which is so mounted that it can gear either with a lower rack Q or with an upper rack Q', both of which may extend along one side of the beam A. The shaft of the pinion P is connected by suitable gearing to the driving shaft or spindle T of an electric motor C, carried by the poise and arranged in connection with suitable reversing-gear to reverse the motion of the poise, causing it to run either in or out on the beam. On the top of the beam A, and extending from end to end, but insulated therefrom, are two metal rods L and L', forming electrical conductors. The electric motor C on the poise B is placed in electrical contact with the conductor L or L' by means of the contact-springs M and M', respectively. When the poise is near the fulcrum O of the steelyard, or in its normal position of rest, the contact M will be upon an insulating-piece N, fixed to the beam, and to this position of rest the poise B is always returned when not weighing. The piece N also serves to insulate the conductors L L'. The motor C, when the current passes by the conductor L, will drive the pinion P, which, being in gear with the lower rack, will propel the poise B in a direction toward the free end of the steelyard. Conversely, when the current passes by the insulated conductor L' the pinion P is brought into gear with the upper rack Q' and propels the poise B backwardly. The electrical contact-points J' and J are in connection with one of the poles of a galvanic battery, (which may conveniently be arranged in the hollow supporting-pillar,) the other pole being connected to the fulcrum-pin O of the beam or to any other convenient part of the apparatus. The circuit is completed by the rocking of the beam, bringing one or other of the contact-points K' K of the conductors L or L' into electrical connection with the contact-points J or J', the electric current passing from the contact-point on the carrier along the conductor L or L' through the electromotor, and by way of the fulcrum O of the beam, or in any other convenient manner, back to the opposite pole of the battery; or the two poles may be connected with double contact-pieces arranged in the loop or carrier X, so that the current will pass by the bar L' and vice versa, in a manner well understood by electricians. The motor C is mounted on a spindle T, which, by means of tooth-wheel gear C' $C^2$ $C^3$ $C^4$ $C^5$, (indicated by broken lines in Fig. 1 and by full lines, so far as may be, in the plan view, Fig. 2,) is connected with the propelling-pinion P, the wheel $C^5$ being on the same shaft with the pinion P. The stud-axle P' for the pinion P is fixed in the end of a lever or arm R, keyed on the central boss of the yoke D. (See Fig. 2.) This latter and the lever R vibrate on the pin F, which is fixed to the side of the poise B, and serves also as the stud-axle for the wheels $C^4$ and $C^3$, which are formed in one piece.

H is a brake for stopping the motion of the motor by pressure against the disk I on the motor-shaft T. This brake is kept on by means of a spring H', and the stem of the brake is provided with a cross-bar $H^2$.

The yoke D is fitted with soft-iron armatures S and S' for the electro-magnets E and E', which act to reverse the direction of motion of the sliding poise. On the yoke D are downwardly-projecting horns, which carry pins G' and G. These pins take under the cross-bar $H^2$ of the brake and serve to raise the brake off the disk I as the yoke is rocked in either direction, and the motor is then free to rotate. The beam in its normal condition—that is to say, without any weight in the scale-pan or on the platform—will have its contact-pieces K K' midway between the contacts J and J', and the battery-circuit will be open. The sliding poise will be near the fulcrum O, and the contact M will be upon the insulated piece N, adjoining the fulcrum. When the load to be weighed is placed upon the platform, the end of the beam rises and the contact K' comes in contact with the upper contact-point J' of the carrier X, thereby causing the current to pass along the insulated conductor L through the sliding contact M' to the electro-magnet E', then through the motor C, and thence through the fulcrum and body of the beam A back to the battery. The armature S' will thus be drawn down by the electro-magnet E', which will bring the pinion P into gear with the lower rack Q. At the same time the pin G in the yoke D will raise the brake H, thus freeing the motor, which will drive the pinion P from left to right and cause it to propel the poise away from the fulcrum O until it counterbalances (in the same way as if moved by hand) the weight on the platform. The moment this takes place the contact K' leaves the contact J', whereby the circuit will be broken, and the brake H will be immediately depressed by its spring H', thus stopping the motor C. Should, however, the poise go beyond the balancing-point, the bottom contact K on the steelyard will come in contact with the contact J, whereby the circuit will again be closed. The current then passes along the conductor L' through the contact M, and from thence to the electro-magnet E, which will attract its armature S on the yoke D, raise the brake H, and allow the motor C again to rotate; but as the opposite end of the yoke will now be raised and the pinion P be in gear with the upper rack Q' the poise will be propelled back toward the fulcrum O until it reaches the point of equilibrium, where the poise just balances the load to be weighed, the circuit being then again broken by the movement of the beam and the motor stopped by the brake H. The weight indicated can be read off in the usual manner by divisions on some convenient part of the beam or in any convenient manner. When the goods are removed from the platform, the contact K naturally comes into contact with the contact-point J, the current passes into the electro-magnet E, as before explained, raises the brake H off the disk I and the pinion P into gear with the upper rack Q', and the pinion being driven by the motor the poise will travel back until the contact-piece runs onto the insulated piece N, thereby breaking the circuit and stopping the poise at its normal position of rest.

It will be evident that instead of the described motor arrangement I may, if desired, use a reversible motor, or I may use two motors. In the latter case I should employ two independent traveling or propelling pinions instead of the one pinion P. These pinions would each gear into a toothed rack on the beam and be separately connected by suitable mechanism to the driving-shafts of the two distinct electromotors, which could be arranged to run in opposite directions or in the same direction, according to the relative positions of the propelling pinions and racks, and be attached to or, in fact, form part of the sliding poise. The insulated conductors may also run along the upper and under sides of the beam, but insulated therefrom, and each motor be in sliding contact with one of the conductors. By the rocking of the beam one or other of the conductors would come in contact with the carrier-contacts J' or J, thus closing the circuit with one or other motor by way of the fulcrum O, or in any other convenient manner, back to the opposite pole of the battery. One or other propelling-pinion would thus be set in motion by its respective motor and cause the poise to travel away from or toward the fulcrum O, as the case may be. The action would otherwise be the same, as above described, with reference to the arrangement illustrated.

What I claim as my invention, and desire to secure by Letters Patent, is—

In a weighing-machine, the combination of a rocking beam provided with electrical contact-pieces, racks on said beam, other and fixed electrical contact-pieces between which the first-named contact-pieces oscillate to make and break contact, a moving poise comprising a frame, an electromotor, a train of gearing for operating on said racks, reversing mechanism for causing a reverse movement of the poise and brake mechanism, and electrical conductors, in connection with the last-named contact-pieces, the electromotor, and a source of electricity, as and for the purpose set forth.

WILLIAM SNELGROVE.

Witnesses:
    W. H. HARRIS,
*Notary Public, Birmingham, England.*
    ALBERT NEWEY,
*Clerk to Reece, Harris & Harris, Solicitors, Birmingham.*